United States Patent [19]
Rose et al.

[11] Patent Number: 5,435,141
[45] Date of Patent: Jul. 25, 1995

[54] APPLICATION OF ORGANIC GAS SENSORS IN THE DETECTION AND SEPARATION OF RECOVERED VOLATILE ORGANIC COMPOUNDS (VOCS)

[75] Inventors: Robert K. Rose, Burnt Hills; Carl W. Woodson, Ballston Lake, both of N.Y.

[73] Assignee: Mechanical Technology Inc., Latham, N.Y.

[21] Appl. No.: 285,926

[22] Filed: Aug. 4, 1994

[51] Int. Cl.⁶ ................................................ F25J 3/00
[52] U.S. Cl. ................................................ 62/18; 62/37; 62/78
[58] Field of Search ........................... 62/18, 37, 78, 93

[56] References Cited
U.S. PATENT DOCUMENTS

| | | | |
|---|---|---|---|
| 4,249,915 | 2/1981 | Sircar et al. | 62/18 |
| 4,276,058 | 6/1981 | Dinsmore | 55/48 |
| 4,283,212 | 8/1981 | Graham et al. | 62/18 |
| 5,035,117 | 7/1991 | Drake et al. | 62/79 |

Primary Examiner—Ronald C. Capossella
Attorney, Agent, or Firm—Kane, Dalsimer, Sullivan, Kurucz, Levy, Eisele and Richard

[57] ABSTRACT

The apparatus and method includes the heating of an inert gas stream, such as nitrogen or inert gas with a low oxygen content, to remove volatile organic compounds from an adsorption bed. The inert gas is then cooled by an evaporator to precipitate or condense the volatile organic compounds into a sump. Gas sensors sense the various volatile organic compound gas concentrations at the inlet and discharge of the evaporator and send signals representative of the concentrations to a signal processor and control logic module. The signal processor and control logic module selectively opens and closes valves which lead from the sump to various containers thereby separating various volatile organic compounds into selected containers. Further, the signal processor and control logic module can generate process control signals to vary the operation of the heating of the gas stream, the cooling of the gas stream, and the circulation of the gas stream.

21 Claims, 2 Drawing Sheets

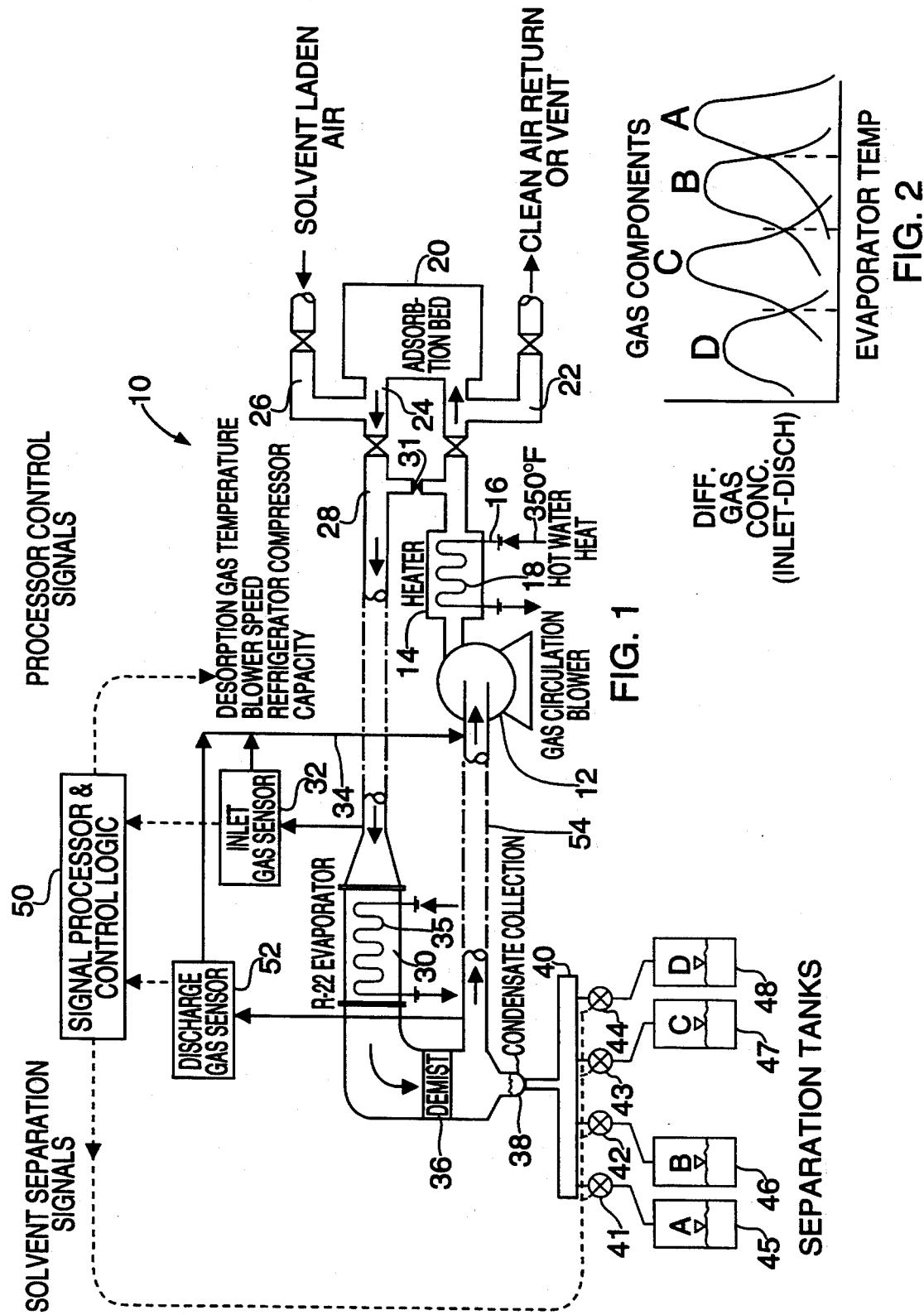

APPLICATION OF ORGANIC GAS SENSORS IN THE DETECTION AND SEPARATION OF RECOVERED VOLATILE ORGANIC COMPOUNDS (VOCS)

BACKGROUND OF THE INVENTION

1. Field of the Invention

The invention pertains to the use of organic gas sensors with a hot gas desorption system using carbon bed adsorption.

2. Description of the Prior Art

In the past, thermal engines have driven heat pumps for the recovery of volatile organic compounds (VOCs), such as disclosed in U.S. Pat. No. 5,035,117, commonly assigned with the present application.

Likewise, hot gas desorption systems have been developed for use with carbon bed adsorption units used in the capture of commercial and industrial solvents. Such systems have been shown to be a highly energy efficient approach to the recovery of solvents compared to the more standard approach of using steam as the desorbing media. The advantages of the hot gas desorption approach over steam lie in the reduction of thermal energy required per pound of solvent recovered, and the lack of steam condensate mixing with the final required liquid. The additional water in solution with the recovered solvent required either further separation by distillation with the expenditure of more energy, or an increase in disposal costs due to the added quantity of material.

However, in the past, it has not been convenient to detect and separate the individual solvent types being recovered in a hot gas desorption system.

OBJECTS AND SUMMARY OF THE INVENTION

It is therefore an object of this invention to provide a hot gas desorption system for use with carbon bed absorption units.

It is therefore a further object of this invention to provide a hot gas desorption system avoiding the use of water or steam as the desorbing medium.

It is therefore a further object of this invention to provide a hot gas desorption system which includes a procedure for detecting and separating the individual solvent types being recovered in a hot gas desorption system.

It is therefore a still further object of this invention to provide a hot gas desorption system which can detect and separate a wide range of individual solvent types.

The hot gas desorption apparatus of the present invention uses an inert gas such as nitrogen or products of combustion with a very low oxygen content as the desorbing medium. The insert gas is heated to an elevated temperature suitable for desorbing the particular solvent of interest. A variable speed blower circulates the hot desorption gas through an isolated desorption bed containing the captured process solvents. A portion of the solvents in the bed are vaporized and carried out of the adsorber with the circulating inert gas.

After leaving the adorption bed the gas stream is cooled in a series of heat exchangers using both water and regenerative heat exchange with a cold return flow from a refrigerant evaporator. Finally, the solvent stream is reduced under controlled conditions in a refrigerant evaporator to the condensing temperature of the particular solvent being recovered. The condensed solvent is then collected in suitable containers and removed from the system.

When several different solvent types are involved, separation can be achieved if there is a sufficient difference in the condensation temperatures of the various solvent types. Gas sensors located immediately ahead of and after the refrigerant evaporator are used to differentiate between gas types based on molecular weight and other physical properties.

As the gas temperature is slowly reduced to the condensation point of the highest temperature condensing solvent, the differential concentration of solvent between the evaporator inlet sensor and the discharge sensor increases. Decreasing the gas temperature further causes the differential sensor values to reach a peak and then decrease as the concentration of that particular solvent is reduced in the gas stream. When the differential concentration of a first solvent decreases to the increasing value of a second solvent, it is assumed that the maximum separation of the first solvent has been achieved. At this point, the collection tank for the first solvent is valved off and isolated from the process. The second solvent is then monitored in the same manner for differential concentration and the process is continued for all remaining solvent components.

Output signals from the gas concentration sensors are used in conjunction with measured process values to control the evaporator temperature and maximize the separation process. Active control of the hot desorption gas temperature, circulation blower speed, and refrigerant compressor capacity are used to maximize the separation process.

An alternative embodiment includes a method and apparatus which includes a first pair of heat exchangers, one of which receives hot water to heat the supply gas stream, and the other of which receives cold water to cool the return gas stream; a second pair of heat exchangers configured as a counterflow regenerator with a blower therebetween to transfer heat from the return gas stream to the supply gas stream; an evaporator to receive refrigerant to cool the return gas stream thereby generating a dry supply gas stream for subsequent heating as described above; and at least one separator tank for collecting the precipitated VOCs.

BRIEF DESCRIPTION OF THE DRAWINGS

Further objects and advantages of the invention will become apparent from the following description and claims, and from the accompanying drawings, wherein:

FIG. 1 is a block diagram of the apparatus of the present invention.

FIG. 2 is a illustrative schematic of differential gas concentration (inlet minus discharge) versus evaporator temperature for a plurality of gas components.

DETAILED DESCRIPTION OF THE PREFERRED EMBODIMENT

Figure 3:
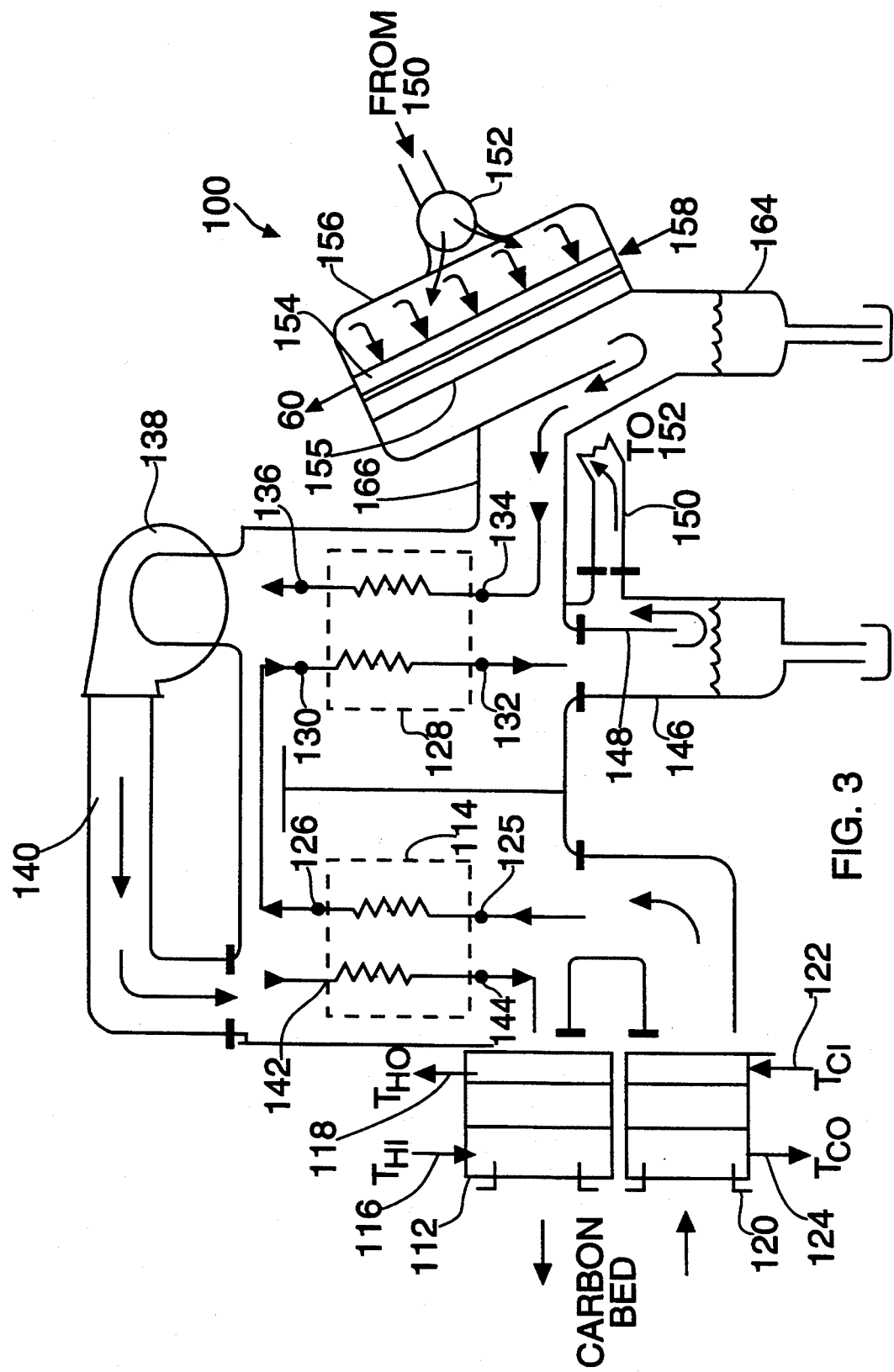
FIG. 3 is a block diagram of an alternative embodiment.

Referring now to the drawings in detail, FIG. 1 is a block diagram of the components of the hot gas desorption apparatus 10.

Hot gas desorption apparatus 10 uses an inert gas such as nitrogen or products of combustion with a very low oxygen content as the desorbing medium. The inert gas is circulated by a variable speed gas circulation blower 12 through apparatus 10, first to heater or heat exchanger 14 which includes an inlet 16 which receives hot water at approximately 350° F. which circulates through coils 18 and heats the inert gas which traverses through the heat exchanger 14. The hot inert gas exiting from the heat exchanger 14 is directed to the adsorption bed 20. An alternate valved path 22 is provided for venting the hot inert gas or for returning the hot inert gas to additional adsorption beds (not shown). The hot inert gas picks up the various volatile organic compounds (VOCs) from adsorption bed 20 and is directed out exit 24. Exit 24 is joined by alternate valved inlet 26, which can be a source of solvent laden gas from additional adorption beds (not shown), thereby forming pipe 28 which leads to R-22 evaporator 30. A valved by-pass 31, which is usually closed, is formed between pipe 28 and the outlet of heat exchanger 14. Prior to reaching evaporator 22, a sample of solvent laden gas is sent to inlet gas sensor 32 and discharged to discharge line 34. Refrigerant is input into coils 35 of evaporator 30 in order to draw the heat from the hot inert gas and cause the volatile organic compounds to precipitate or condense therefrom.

The inert gas, along with the VOCs, passes from the evaporator 30 to the de-mist module 36. The precipitated or condensed VOCs collect thereafter in condensate collection 38 which leads to sump 40. Sump 40 includes a plurality of valved outlets, illustrated in FIG. 1 as valved outlets 41, 42, 43 and 44 which lead to separation tanks 45, 46, 47 and 48, respectively. Valved outlets 41, 42, 43 and 44 are electronically controlled by signal processor and control logic 50 module via solvent separator signals which are generated in response to inlet gas sensor 32 and discharge gas sensor 52. The timing and sequence of the opening and closing of the valved outlets 41, 42, 43 and 44 causes the collection of specific VOCs within specific separation tanks 45, 46, 47 and 48 as will be described hereinafter.

The hot inert gas and any uncondensed VOCs are directed along pipe 54 to return to gas circulation blower 12. A sample of the hot inert gas is removed from pipe 54 to be analyzed by discharge gas sensor 52. The gas sample is then discharged via line 34, along with the discharged sample from inlet gas sensor 32, to pipe 54 immediately before the inlet to gas circulation blower 12 for the process, usually closed-loop, to continue.

As previously discussed, inlet gas sensor 32 differentiates between gas types based on molecular weight and other physical properties at the inlet to evaporator 30. Discharge gas sensor 52 senses these properties somewhat downstream from the discharge of evaporator 30. The signals from gas sensors 32 and 52 are received by signal processor and control logic module 50 which generates solvent separation signals to valved outlets 41, 42, 43, 44 (which open and close to start and stop the collection of precipitated VOCs within separation tanks 45, 46, 47 and 48) and further generates process control signals which vary or regulate system variables including desorption gas temperature, gas circulation blower speed and refrigerator compressor capacity.

In a process involving several different solvent types, separation can be achieved if there is a sufficient difference in the individual condensing temperatures. As the gas temperature is slowly reduced (by variation of the process control signals), the differential concentration of solvent between the inlet gas sensor 32 and the discharge gas sensor 52 increases as illustrated by FIG. 2, such as the curve for solvent "A". Decreasing the gas temperature further causes the differential sensor value to reach a peak and then decrease as the concentration of the particular solvent is reduced in the gas stream. When the differential concentration of solvent "A" decreases to the increasing value of solvent "B", it is assume that the maximum separation of solvent "A" has been achieved. At this point, the collection tank for solvent "A" is valved off and isolated from the process. Solvent "B" is then monitored in the same manner as solvent "A" for differential concentration and the process continued for all remaining solvent components.

Output signals from the gas sensors 32 and 52 are used in conjunction with measured process values to control the evaporator temperature and maximize the separation process. Active control of the hot desorption gas temperature, circulation blower speed, and refrigerant compressor capacity are used in achieving this objective.

To use apparatus 10, adsorption bed 20 along valved outlet 22 and valved inlet 26 are configured properly, usually resulting in a closed-loop system with inert gas, such as nitrogen with a low oxygen content, therein. The operating parameters for variable speed gas circulation blower 12, heat exchanger 14 and evaporator 30 are chosen in accordance with the VOCs of interest in adsorption bed 20. Similarly, set-points and similar variables are set in signal processor and control logic module 50 in accordance with the VOCs of interest. Gas circulation blower 20 is activated to cause circulation of the hot inert gas within the system. As the process continues, the collected precipitated volatile organic compounds are periodically removed from separation tanks 45, 46, 47 and 48.

Referring now to an alternate embodiment in FIG. 3, apparatus 100 is designed to supply this low-dewpoint heat gas stream from heat exchanger 112 to the carbon bed (not shown), typically at 600 standard cubic feet per minute. Heat exchanger 112 receives gas from heat exchanger 114. Heat exchanger 112 further receives hot water ($T_{H1}$, or temperature, hot, inlet) via inlet 116 and discharges the hot water via outlet 118 ($T_{H0}$, or temperature, hot, outlet), transferring a portion of the heat therefrom to the gas stream. This supply gas stream is heated to typically 300° F. by the heat exchange from the hot water and supplied thereafter to the carbon bed. However, this gas stream is very dry due to the prior refrigeration of the gas stream which causes moisture to precipitate therefrom.

Heat exchanger 120 receives the return gas stream from the carbon bed (not shown). This return gas stream includes the 600 standard cubic feet per minute gas stream as supplied from heat exchanger 112. This return gas stream additionally includes VOCs, perhaps 50 pounds per hour, recovered from the carbon bed. This return gas may be as cool as 60° F., but may be as hot as 300° F., particularly if the carbon bed has been exposed to the 300° F. gas stream from heat exchanger 112 for a prolonged period.

Heat exchanger 120 cools the return gas stream, including VOCs, by receiving cold water via inlet 122 ($T_{Ci}$, or temperature cold, inlet) and transferring heat from the return gas stream and discharging the water at an increased temperature through outlet 124 ($T_{Co}$, or temperature, cold, outlet). The output from heat exchanger 120 is typically known as the "hot gas inlet". A typical return gas stream temperature as the stream exits heat exchanger 120 and is supplied to inlet 125 is 100° F.

The resulting return gas stream (including VOCs) output from heat exchanger 120 is further reduced in temperature by heat exchanger 114 (via inlet 125 and outlet 126) and heat exchanger 128 (via inlet 130 and outlet 132). Heat exchangers 114, 128 can be provided as a single counterflow regenerator unit. Heat exchangers 114, 128 transfer heat from the return gas stream to the supply gas stream which passes through inlet 134 and outlet 136 of heat exchanger 128, blower 138 (with a head rise of fifteen to twenty inches of water), blower output pipe 140, and inlet 142 and outlet 144 of heat exchanger 114 on its way to heat exchanger 112 (described hereinabove).

As the return gas stream is reduced in temperature by heat exchanger 128, VOCs precipitate therefrom and are captured by separator tank 146 (which may be replaced by multiple separator tanks at different temperature points throughout the flow path to capture VOCs of different boiling temperatures). The return stream thereafter passes by baffle 148 and travels pipe 150 to evaporator inlet blower 152. A typical gas temperature at inlet blower 152 is 0° F. as opposed to the 100° F. outlet temperature of heat exchanger 120 (hot gas inlet) thereby demonstrating the energy savings achieved by the counterflow regenerator unit of heat exchangers 114 and 128.

Evaporator inlet blower 152 blows the return gas stream from pipe 150 across refrigerant coils 154 and hot defrost coils 155 of evaporator 156. Refrigerant coils 154 receive refrigerant via inlet 158 from a standard vapor compression refrigerant cycle (including, for example, a reciprocating compressor and condensing unit 'not shown'). The refrigerant is typically at −40° F. thereby cooling the gas stream to −30° F. This further decrease in temperature causes further VOCs and other material to precipitate from the gas stream and collect in separator tank 164. This refrigeration causes the resultant supply gas stream to be very dry notwithstanding the subsequent heating by heat exchangers 112, 114 and 128.

The gas stream, now denominated as the supply gas stream rather than the return gas stream within the closed loop, then traverses pipe 166 (the cold gas inlet to apparatus 100) to inlet 134 of heat exchanger 128.

In order to defrost apparatus 100, the refrigerant liquid is terminated to evaporator 156 and replaced with hot compressor discharge vapor, typically at a temperature of about 138° F.

To use apparatus 100, the user provides a closed loop fluid communication from heat exchanger 112 through a carbon bed (or similar apparatus) and returning through heat exchanger 120. The user provides hot water to inlet 116 of heat exchanger 112 to provide for the initial heating of the supply gas stream and similarly provides cold water to inlet 122 of heat exchanger 120. The user activates blowers 138 and 152 and provides refrigerant to evaporator coils 154 via inlet 158. The supply gas stream from evaporator 156 is initially very cold thereby providing a dry supply gas stream which is subsequently heated by heat exchangers 112, 114 and 128 while maintaining its dry characteristic. The supply gas stream is passed through the carbon bed thereby picking up the VOCs resident therein. The gas stream returns to apparatus 100 to be cooled by heat exchangers 120, 114, 128 and evaporator 156. This cooling causes the VOCs and other materials to precipitate from the gas stream.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An apparatus for separating volatile organic compounds from a stream of gas, including:
   means for driving the stream of gas;
   means for cooling the stream of gas thereby causing precipitation of volatile organic compounds from the stream of gas;
   sump means for collecting the precipitated volatile organic compounds, said sump means including a plurality of exits, said exits including valve means to provide selective fluid communication to respective collection means;
   first means for sensing the stream of gas at an inlet of said cooling means;
   second means for sensing the stream of gas at an outlet of said cooling means;
   processing means receiving signals from said first and second means for sensing the gas stream indicative of concentrations of selected volatile organic compounds, said processing means providing signals controlling said valve means thereby causing selected volatile organic compounds to be collected in selected collection means.

2. The apparatus of claim 1 wherein said processing means further includes means for varying operation of said means for driving the stream of gas and means for varying operation of said cooling means.

3. The apparatus of claim 2 further including means for heating the stream of gas to facilitate evaporation of volatile organic compounds into the stream of gas.

4. The apparatus of claim 3 wherein said processing means further includes means for varying operation of said means for heat thereby varying a temperature of the stream of gas.

5. The apparatus of claim 4 wherein said means for cooling stream of gas is an evaporator.

6. The apparatus of claim 4 wherein said means for heating the stream of gas is a heat exchanger.

7. The apparatus of claim 4 wherein said sump means includes a condensate collection point lower than said cooling means, in fluid communication with a lower horizontal pipe including said plurality of exits, said exits leading to respective said valve means, said valve means controlling fluid communication to said respective selected collection means.

8. The apparatus of claim 4 wherein the gas stream includes nitrogen or inert gases substantially free of oxygen.

9. A method for separating volatile organic compounds from a stream of gas, including the steps of:
   driving the stream of gas;
   cooling the stream of gas thereby causing precipitation of volatile organic compounds from the stream of gas;
   collecting the precipitated volatile organic compounds through a plurality of valves leading to respective containers;
   sensing the stream of gas at an inlet of said cooling means;
   sensing the stream of gas at an outlet of said cooling means;

receiving and processing signals from said steps of sensing the gas stream indicative of concentrations of selected volatile organic compounds;

providing signals, responsive to said receiving and processing step, controlling said valves thereby causing selected volatile organic compounds to be collected in said respective containers.

10. The method of claim 9 wherein said step of providing signals further includes the steps of providing signals for varying operation of said step of driving the stream of gas and providing signals for varying operation of said cooling step.

11. The method of claim 10 further including the step of heating the stream of gas to facilitate evaporation of volatile organic compounds into the stream of gas.

12. The method of claim 10 wherein said step of providing signals further includes the step of providing signals for varying step of heating thereby varying a temperature of the stream of gas.

13. The method of claim 10 further including the step of providing nitrogen or inert gas substantially free of oxygen as the stream of gas.

14. An apparatus for generating a supply gas stream to a bed and receiving a return gas stream from the bed, the return gas stream including volatile organic compounds from the bed, comprising:

a heating means for externally heating the supply gas stream prior to being supplied to the bed;

a cooling means for externally cooling the return gas stream after being received from the bed;

heat exchanger means for exchanging heat energy from the return gas stream to the supply stream;

blower means for urging the supply gas stream to the bed;

evaporator means, including coil means for receiving a refrigerant and means for urging the return gas stream from said heat exchanger means through said coil means thereby reducing the temperature of the return gas stream and supplying the supply gas stream to said heat exchanger means; and separator tank means to collect precipitant VOCs from the return gas stream as the return gas stream is cooled.

15. The apparatus of claim 14 wherein the supply gas stream, the return gas stream, and the carbon bed are in a closed loop.

16. The apparatus of claim 15 wherein said separator tank means includes a first reservoir means to collect precipitant from said evaporator means.

17. The apparatus of claim 16 wherein said separator tank means includes a second reservoir means to collect precipitant from said heat exchanger means.

18. The apparatus of claim 17 wherein said heat exchanger means includes first and second heat exchangers configured as a counterflow regenerator.

19. The apparatus of claim 18 wherein said first and second heat exchangers include said blower means therebetween.

20. The apparatus of claim 19 wherein said heating means includes a third heat exchanger receiving heated water to heat the supply gas stream.

21. The apparatus of claim 20 wherein said cooling means includes a fourth heat exchanger receiving cooled water to cool the return gas stream.

* * * * *